No. 674,745. Patented May 21, 1901.
C. W. SPONSEL.
BRAKE MECHANISM.
(Application filed June 14, 1900.)

(No Model.) 2 Sheets—Sheet 1.

Witnesses:

Inventor:
Charles W. Sponsel,

No. 674,745. Patented May 21, 1901.
C. W. SPONSEL.
BRAKE MECHANISM.
(Application filed June 14, 1900.)
(No Model.) 2 Sheets—Sheet 2.

Witnesses:
Chas. F. Schmitz
Jos. Merritt

Inventor:
Charles W. Sponsel,
By William A. Lorenz
Attorney

THE NORRIS PETERS CO., PHOTO-LITHO., WASHINGTON, D. C.

UNITED STATES PATENT OFFICE.

CHARLES W. SPONSEL, OF HARTFORD, CONNECTICUT, ASSIGNOR OF ONE-HALF TO WILLIAM A. LORENZ, OF SAME PLACE.

BRAKE MECHANISM.

SPECIFICATION forming part of Letters Patent No. 674,745, dated May 21, 1901.

Application filed June 14, 1900. Serial No. 20,232. (No model.)

*To all whom it may concern:*

Be it known that I, CHARLES W. SPONSEL, a citizen of the United States of America, and a resident of Hartford, in the county of Hartford and State of Connecticut, have invented certain new and useful Improvements in Brake Mechanism, of which the following is a specification.

This invention relates to brake mechanism for bicycles, and more especially to that class thereof in which the brake is operated by the hand of the rider; and it has for one of its objects the provision of an improved device which may readily be removed from or attached to the handle-bar, even if the curvature thereof is very complex.

My invention has, furthermore, for its object the improved organization of the elements constituting the brake mechanism and in such manner that the operating-handle of the device may readily be adjusted according to the requirements of any rider, both as to the "spread" or distance from the handle-bar as well as to the alinement therewith.

Further objects of my invention may be found in the improved construction of some of the component and coöperative parts, as will be hereinafter described, and particularly pointed out in the claims.

It is well known that the handle-bars of different machines vary to a great extent in formation and curvature, so that each individual style necessitates a brake mechanism which is especially designed therefor, and that if by accident such bar should be bent the manipulation of the brake-operating handle is rendered difficult. Therefore my invention includes as one of its features a rock-shaft which is supported in bearings adapted for independent adjustment on the handle-bar, so that the proper working of the mechanism will not be affected even if the bar should be bent, in which case the bearings may be readjusted without difficulty. This brake mechanism may also be placed in proper position on either end of the handle-bar, so as to be operable by either hand of the rider.

Figure 1:
Figure 2:
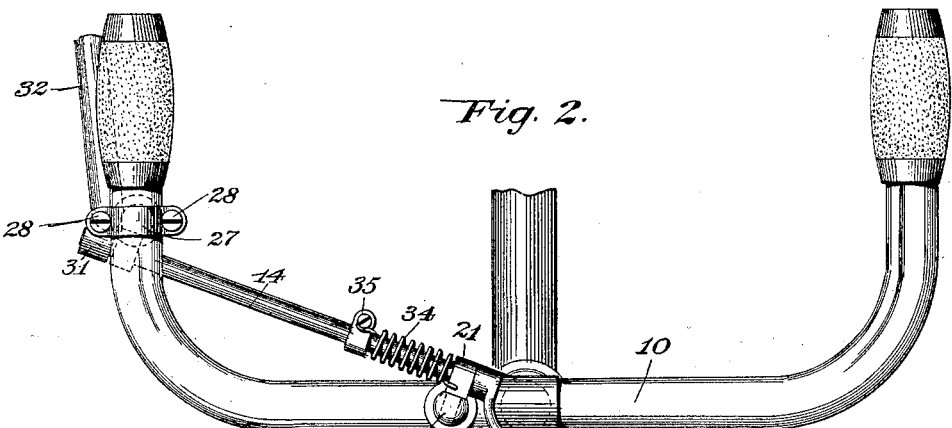
Figure 3:
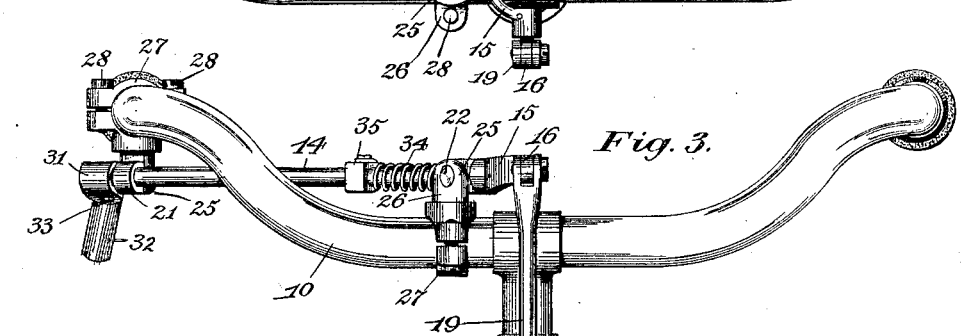
Figures 4, 5:
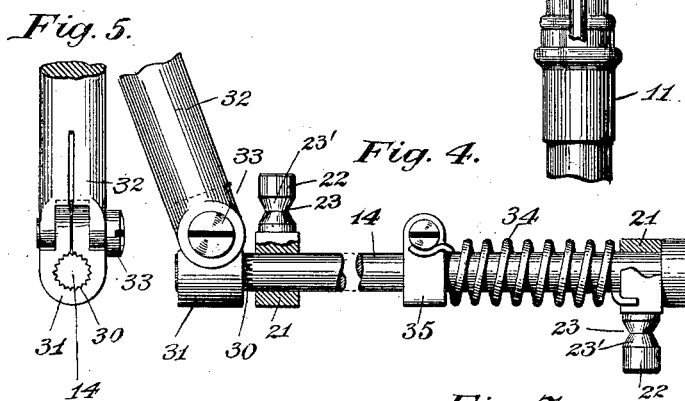
Figure 6:
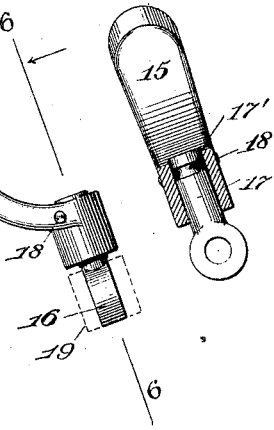
Figure 7:
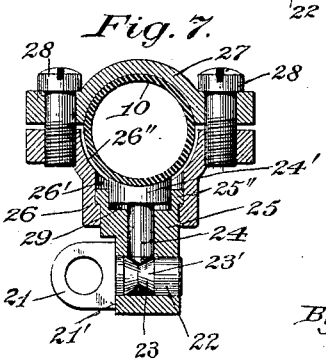

In the accompanying drawings, in which similar characters denote similar parts, Figure 1 is a perspective view of the front end of a bicycle having my improved brake-operating mechanism in position on the handle-bar. Fig. 2 is a top view of the handle-bar and the mechanism. Fig. 3 is a front view of the same. Fig. 4 is a top view of the rock-shaft and its appurtenances, on an enlarged scale. Fig. 5 is an end view of the handle end thereof. Fig. 6 is a section on line 6 6, Fig. 4; and Fig. 7 is a central section through the hanger and clamp which support the shaft on the bar.

In Fig. 1 of the drawings a brake mechanism embodying my invention is shown applied to the handle-bar 10 of a bicycle, comprising the stem 11 and the front fork 12, in which the wheel 13 may be journaled, the parts thus far enumerated being of ordinary construction.

My improved brake-operating device includes a rock-shaft, such as 14, (see Fig. 4,) preferably provided near one of its ends with an actuating member, shown herein as a crank-arm 15, which may be secured on said shaft in any desired manner. At its free end the crank 15 carries a swivel 16, having a shank portion 17, which may be circumferentially grooved, as shown at 17', to be engaged by a pin, such as 18, so that said swivel will be free to rock in the crank-arm, but is retained against longitudinal movement therein, as will be readily understood. Pivotally secured to said swivel 16 is the upper end of a link 19, the lower end of which may be attached to a suitable brake, which in this instance is shown as a shoe 20, pivoted to the fork 12 and adapted to engage the wheel 13.

The rock-shaft 14 is journaled in a pair of independently-adjustable and self-alining bearings, which are held on the handle-bar by suitable hangers or clamping devices, constituting an important feature of my present invention. Inasmuch as the particular organization and construction of these hangers and the bearings carried thereby are similar, the following description of one may be considered sufficient for both, reference being had especially to Fig. 7 of the drawings, in which the bearing proper is designated by the numeral 21.

The bearing may have a trunnion 22, preferably provided with a groove 23, adapted to be engaged by a retaining member, consisting in the present instance of a pin 24, the lower end of which bears against one wall, as 23', of the groove 23. The bearing 21, having a shoulder 21', is preferably supported by a swivel 25, which has at its upper end an annular flange 25'', rotatably seated in a recess 26' of a hanger 26, forming, in connection with the cap 27, a clamping device to be secured to the handle-bar 10. Any suitable means may be employed for clamping the hanger 26 and cap 27, the means illustrated in the drawings consisting of screws, such as 28. The swivel 25 may be provided with a recess 29, adapted to receive an enlarged head portion 24' of the pin 24, said head being preferably formed to fit against the surface of the handle-bar 10. The inner surface 26'' of the hanger 26 is preferably left free from contact with the handle-bar, while the cap 27 bears against the same, so that when the screws 28 are tightened pressure is put upon the head 24' of the pin 24, the lower end of which is in engagement with the wall 23' of the groove 23. This action will not only draw the shoulder 21' against the swivel 25 and clamp the bearing 21, but will also hold the swivel 25, thus clamping the device as a whole on the handle-bar.

By employing a hanger as just described the bearing is adapted for alinement with the rock-shaft in every possible direction, and it is entirely immaterial how complex the curvature of the handle-bar may be.

My invention includes as one of its features an operating-handle which may easily be adjusted in accordance with the requirements of the rider and with the manifold positions which the rock-shaft may have at different times. The operating-handle 32 may therefore be adjusted axially relatively to the crank-arm 15 as well as relatively to the handle of the handle-bar. In the preferred construction (illustrated in Figs. 4 and 5) the rock-shaft 14 is ribbed, as indicated at 30, to engage a correspondingly-formed collar 31, which may be axially adjusted on said shaft and may be split to be clamped in place by a screw 33, serving at the same time to secure the handle 32 (also having a split end) in position on the collar, the handle being adjustable transversely of the shaft around the screw 33 as a pivot. While the handle 32 is primarily intended to "set" the brake, means are provided for releasing the brake, the means illustrated in the drawings comprising a torsional spring 34, supported on the shaft 14 and having one of its ends in engagement with one of the bearings 21, while its other end engages a collar 35, adjustably mounted on said shaft to regulate the tension and lifting power of the spring.

From the above it will be understood that the brake-operating mechanism forming the subject-matter of this application is in reality an interchangeable device, which may be attached to the handle-bar of any bicycle, irrespective whether the rider prefers to manipulate the brake with the right or left hand. Likewise the axial position of the rock-shaft may be changed from that shown in the drawings. For instance, the shaft may be placed below the handle-bar for its entire length, in which case the crank-arm would necessarily straddle the post, the curvature of the crank of course permitting such an organization of the device as a whole.

Although the brake mechanism has been illustrated and described as applied to an ordinary brake-shoe, my invention may be adapted for use in connection with other forms of brakes, whether acting upon the front or rear wheel.

The self-alining devices of the rock-shaft bearings may be modified in many respects without departing from the scope of my invention, so long as the self-alining feature is retained.

Having described my invention, what I claim as new, and desire to secure by Letters Patent, is—

1. The combination, with a handle-bar; and with a brake-shoe; of a rock-shaft; means for operating said shoe from said rock-shaft; and a handle adjustable transversely of the rock-shaft and into alinement with the handle of the handle-bar.

2. The combination, with a handle-bar; and with a brake-shoe; of a rock-shaft; means for operating said shoe from said rock-shaft; an operating-handle adjustably secured on said shaft; and adjustable transversely thereto.

3. The combination, with a handle-bar; and with a brake-shoe; of a rock-shaft; ribbed at one of its ends; a crank mounted on the shaft; and a handle in engagement with the ribbed end of the shaft and adjustable transversely thereto.

4. The combination, with a handle-bar; and with a brake-shoe; of a rock-shaft mounted for oscillation on the handle-bar; a crank mounted on said rock-shaft; a swivel carried by the crank; and a link connecting said swivel and shoe.

5. The combination, with a handle-bar; and with a brake-shoe; of a rock-shaft; and plurality of independently universally adjustable bearings, secured on the handle-bar; and means for operating said shoe from said rock-shaft.

6. The combination, with a handle-bar; and with a brake-shoe; of a rock-shaft; a pair of self-alining bearings supporting said shaft; swivels carrying said bearings, and adjustably mounted on said bar.

7. The combination, with a handle-bar; and with a brake-shoe; of a rock-shaft; a plurality of bearings supporting said shaft; and each having a trunnion; a swivel rotatably supported on the handle-bar and having an aperture for receiving said trunnion; and a pin in engagement with the trunnion and the handle-bar for securing said swivel and simultaneously therewith the bearing in position on the bar.

8. The combination, with a handle-bar; and with a brake-shoe; of a rock-shaft; a plurality of bearings supporting said shaft; and each having a trunnion; a swivel rotatably supported on the handle-bar and having an aperture for receiving said trunnion; and means for securing said swivel and simultaneously therewith the bearing in position on the bar.

9. The combination, with a handle-bar; and with a brake-shoe; of a rock-shaft; a plurality of bearings supporting said shaft, and each having a grooved trunnion; a swivel rotatably supported on the handle-bar and having an aperture for receiving said trunnion; and a pin adapted for engagement with one wall of said groove and also the handle-bar; and clamping means for forcing said pin into contact with said trunnion and handle-bar.

10. The combination, with a handle-bar; and with a brake-shoe; of a rock-shaft; and plurality of independently-adjustable bearings supporting said shaft, and secured on the handle-bar; swivels carrying said bearings; and means for securing said bearings and swivels together.

11. The combination, with a handle-bar; and with a brake-shoe; of a rock-shaft; a plurality of independently-adjustable bearings secured on the handle-bar; swivels carrying said bearings; devices supporting said swivels; and means for securing said devices and simultaneously therewith the swivels, in fixed positions on the handle-bar.

12. The combination, with a handle-bar; and with a brake-shoe; of a rock-shaft; a handle adjustable transversely of the shaft; and a spring encircling said shaft, and tending to rock the shaft in a direction opposite to that given by the handle.

13. The combination, with a handle-bar; and with a brake-shoe; of a rock-shaft; a handle adjustable transversely of the shaft; and a spring encircling said shaft, and tending to rock the shaft in a direction opposite to that given by the handle, and means for varying the tension of the spring.

14. The combination, with a handle-bar; and with a brake-shoe; of a rock-shaft; a crank mounted thereon; a handle also on said shaft and adjustable transversely of the rock-shaft, and into alinement with the handle of the handle-bar.

15. An interchangeable brake-operating mechanism comprising a rock-shaft; a pair of self-alining bearings therefor; swivels carrying said bearings; and having head portions and hangers adjustably secured on the handle-bar; and having recesses to receive the head portions of the swivels.

16. An interchangeable brake-operating mechanism comprising a rock-shaft; a pair of self-alining bearings therefor; swivels carrying said bearings; and having head portions and hangers adjustably secured on the handle-bar; and having recesses to receive the head portions of the swivels; and means for clamping hangers and swivels simultaneously.

17. An interchangeable brake-operating mechanism comprising a rock-shaft; a pair of self-alining bearings therefor; swivels carrying said bearings; means for securing said bearings and swivels together; a spring encircling said rock-shaft, and having one of its ends secured thereto; and adapted to rock said shaft in one direction; and a handle for rocking said shaft in the other direction.

CHARLES W. SPONSEL.

Witnesses:
CHAS. F. SCHMELZ,
JOS. MERRITT.